United States Patent [19]
Salley

[11] Patent Number: 4,710,067
[45] Date of Patent: Dec. 1, 1987

[54] ROTARY AIR LOCK FEEDER

[76] Inventor: Frank Salley, 4425 Peachtree-Dunwoody Rd., NE., Atlanta, Ga. 30342

[21] Appl. No.: 849,691

[22] Filed: Apr. 9, 1986

Related U.S. Application Data

[63] Continuation-in-part of Ser. No. 689,477, Jan. 7, 1985, abandoned.

[51] Int. Cl.$^4$ .............................................. B65G 53/46
[52] U.S. Cl. ........................................ 406/64; 406/67
[58] Field of Search ...................................... 406/62–68; 222/636; 414/219, 220

[56] References Cited

U.S. PATENT DOCUMENTS

| | | | |
|---|---|---|---|
| 2,813,640 | 11/1957 | Loomis | 406/67 |
| 3,009,744 | 11/1961 | Lenhart | 406/67 |
| 4,180,188 | 12/1979 | Aonuma et al. | 414/219 X |

FOREIGN PATENT DOCUMENTS

| | | | |
|---|---|---|---|
| 560263 | 7/1958 | Canada | 406/64 |
| 601384 | 9/1932 | Fed. Rep. of Germany | 406/65 |

*Primary Examiner*—Jeffrey V. Nase
*Attorney, Agent, or Firm*—Thomas & Kennedy

[57] ABSTRACT

A rotary air lock feeder has a cylindrical chamber closed at opposite ends by end walls and a rotor mounted for rotary movement along the cylindrical chamber axis. A hopper is provided for feeding material into an upper portion of the chamber. A port is formed in each of the end walls to one side of a vertical plane extending through the cylindrical chamber axis at a height above the angle of natural repose of the material. So constructed, material fed into the chamber may be driven by the rotor to the bottom of the chamber and then lifted by the rotor to a position between the end wall ports and become evenly entrained in an airstream flowing through the chamber between the ports.

4 Claims, 17 Drawing Figures

SOLUTION

ROTARY AIR LOCK FEEDER

REFERENCE TO RELATED APPLICATION

This is a continuation-in-part of application Ser. No. 689,477 filed Jan. 7, 1985, now abandoned.

TECHNICAL FIELD

This invention relates generally to rotary air lock feeders, and particularly to rotary air lock feeders of the type used in blowing fibrous insulation.

BACKGROUND OF THE INVENTION

Rotary air lock feeders are widely used today to entrain particulate materials in airstreams. These types of feeders of the prior art are exemplified by those shown in U.S. Pat. Nos. 2,721,767, 3,556,355 and 4,268,205 and in Canadian Pat. No. 560,263. Today, they typically have a metering chamber in which a multi-vaned rotor is rotatably driven about a horizontal axis. A hopper is mounted above the chamber through which materials may be gravity or force fed down into the top of the metering chamber. A discharge shoot is provided in the bottom of the chamber through which the material is discharged after having been metered by the rotor. Material exiting the chamber through the discharge shoot is delivered into an air duct through which a stream of air flows and thereby becomes entrained in the airstream.

With some of the more recent types of rotary air lock feeders the airstream is passed through a lower portion of the metering chamber itself, fed through aligned inlet and outlet ports in the chamber end walls. These are exemplified in U.S. Pat. Nos. 3,009,744, 4,111,493 and 4,465,239.

When used to entrain fibrous insulation into airstreams to form layers or beds of insulation in situ, rotary air lock feeders of the prior art have had several definitive problems associated with their use. Specifically, the length of the feeders and associated hoppers, as measured in the direction of air flow, has been limited. Where made relatively long, such as in excess of some 30 inches to increase capacity, and thus delivery rate, they have tended to become jammed or clogged as gravity empties the longer airlocks too quickly for the airstreams to move the material. In addition, even rotary air lock feeders of lesser lengths have tended to create uneven, pulsating streams of insulation. Thus, streams of insulation delivered from rotary air lock feeders of the prior art have been uneven, pulsating, limited in material flow rates and susceptible to becoming jammed and clogged.

Accordingly, it is to the provision of a rotary air lock feeder and method of feeding particulate materials such as fibrous insulation, that overcomes these limitations of the prior art, to which the present invention is primarily directed.

SUMMARY OF THE INVENTION

In one form of the invention a rotary air lock feeder comprises a cylindrical chamber having a chamber axis. A rotor is mounted within the chamber for rotation about the chamber axis. The rotor has a set of angularly spaced vanes that extend radially outwardly from a rotor shaft. A hopper communicates with the chamber through an inlet located in an upper portion of the chamber to one side of a vertical plane that extends through the chamber axis. Aligned ports are formed in a lower portion of the end walls of the cylindrical chamber to the other side of the vertical plane through which ports a stream of air may flow and entrain material fed into the chamber from the hopper. The ports are located at positions sufficiently elevated from the bottom of the chamber such that the leading side of material introduced between the ports by the rotor is along a slope substantially equal to or less than the angle of natural repose of the material.

In another form of the invention a rotary air lock feeder comprises a cylindrical chamber having an axis and being closed at opposite ends by end walls. A rotor is mounted for rotary movement along the cylindrical chamber axis which has a shaft mounted for rotary movement along the chamber axis from which five angularly spaced vanes extend. Means are provided for feeding material into an upper portion of the cylindrical chamber. A port is formed in each of the end walls, the bottom edges of which extend generally radially of the chamber axis at an elevation at or above the 4:30 or 7:30 clock radial. So constructed, particulate material may be fed into the chamber and driven by the rotor to the bottom of the chamber and then lifted by the rotor to a position between the end wall ports and become entrained in an airstream flowing through the chamber between the ports without substantial entrainment occurring of naturally gravitating material.

In yet another form of the invention a method of forming a stream of particulate material such as fibrous insulation comprises the steps of passing an airstream through a generally cylindrical chamber to one side of the chamber axis at an elevation above the chamber radial defined by the angle of natural repose of the particulate material. Particulate material is fed into an upper portion of the chamber to the other side of the chamber axis and formed into batches. The batches are successively moved about the chamber axis to the bottom of the chamber and then lifted up and into the airstream. In this manner the material may be evenly entrained by erosion of upper surfaces of the batches by the airstream without substantial entrainment occurring from material gravitating into or within the airstream.

BRIEF DESCRIPTION OF THE DRAWING

FIG. 11A illustrates a port located too low for material being entrained in accordance with the present invention, while

DETAILED DESCRIPTION

Figure 1:
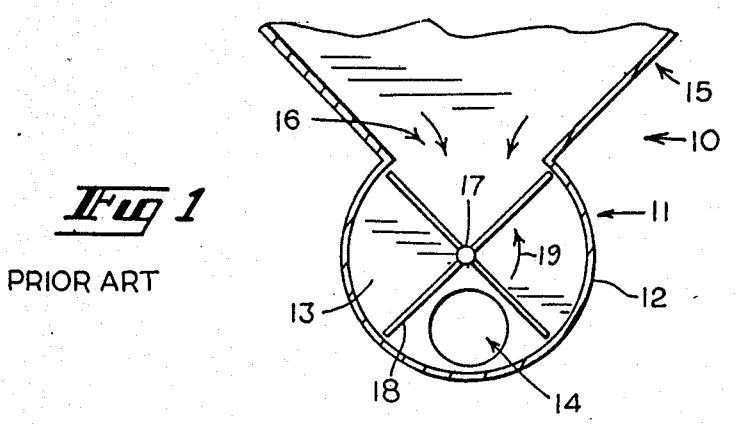
FIG. 1 is a transverse sectional view of a typical rotary air lock feeder of the prior art.

In FIG. 1 a rotary air lock feeder 10 of the prior art is seen to have a cylindrical chamber 11 formed by a partially cylindrical side wall 12 and two end walls 13. The end walls are formed with mutually aligned inlet and outlet ports 14 located along a vertical plane extending through the axis of the cylindrical wall 11 below that axis. A hopper, shown generally at 15, is mounted above the chamber 11 providing fluid communication with the chamber through an inlet denoted generally at 16. Though the side walls of the hopper are shown to converge down to the inlet, they may instead be vertically oriented. A rotor is rotatably mounted within the chamber 11 and is seen to include a shaft 17 from which four vanes 18 radially extend. In operation, a stream of air is passed through the cylindrical chamber 11 between the two aligned ports 14 with the rotor driven in the direction indicated by the arrow 19. Particulated material, such as fibrous insulation, is gravity fed, or driven by an unshown worm gear or by paddles, from the hopper 15 down into the chamber 11. Once in the chamber rotation of the rotor vanes 18 serves to meter the material into batches and then into the airstream as it passes between the two ports 14.

Figure 2:
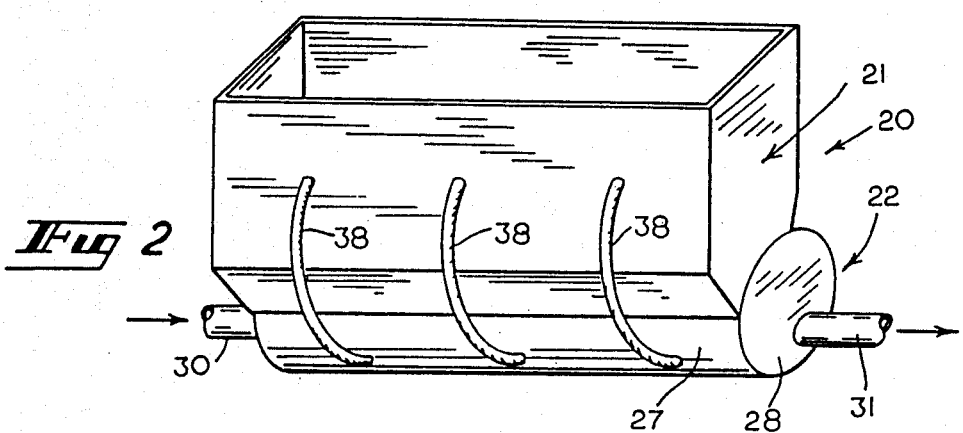
FIG. 2 is an isometric view of a rotary air lock feeder embodying principles of the present invention and which may be used in practicing a method of the invention.
Figure 3:
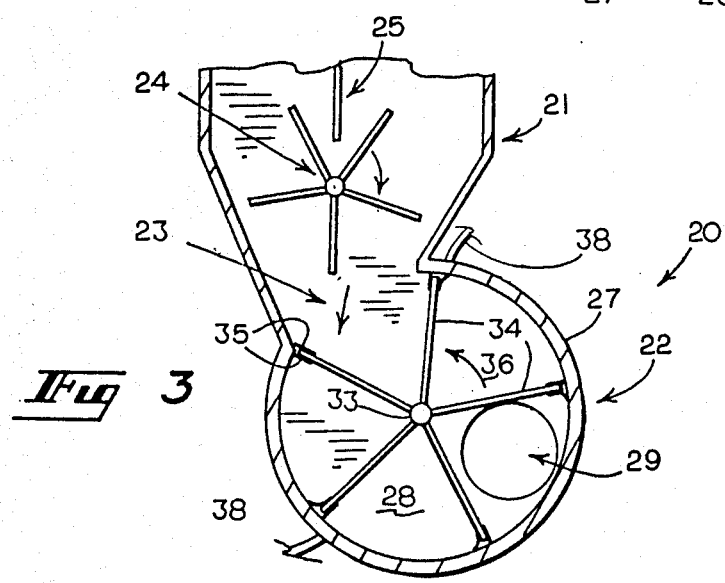
FIG. 3 is a transverse sectional view of the rotary air lock feeder illustrated in FIG. 2.

With reference next to FIGS. 2 and 3, a rotary air lock feeder 20 embodying principles of the present invention is seen to include a hopper 21 mounted above a cylindrical chamber 22 so as to be in fluid communication with the chamber through a slot-like inlet denoted generally at 23 that is located to the left hand side of a vertical plane passing through the axis of the cylindrical chamber. Two paddle wheels 24 and 25 are mounted for rotation by unshown motor means within the hopper 21. The chamber 22 is seen to include a cylindrical side wall 27 closed at each end by end walls 28. A port 29 is formed within each of the end walls offset from the same vertical plane. These ports are mutually aligned at locations sufficiently high as to preclude gravity flow of material into an airstream passing therebetween, as hereinafter further explained. An intake conduit 30 extends from one port while an outlet conduit 31 extends from the other port. The two ports 29 and conduits 30 and 31 are in axial alignment beside the chamber axis.

With continued reference to FIGS. 2 and 3, the feeder 20 is further seen to include a rotor having a shaft 33 rotatably mounted along the axis of the cylindrical chamber 22 from which shaft five equally angularly spaced vanes 34 radially extend. An unshown motor is coupled with the rotor shaft. To each side of the end of each vane distal the shaft is secured a resilient wiper 35 which acts as sealers. Thus, upon rotation of the rotor in the direction indicated by arrow 36 five individual cells or pockets are formed by the vanes as labelled alphabetically in FIGS. 5A-5C. Two air bleed lines 38 provide fluid communication with selected portions of the interior of the chamber 22 and the hopper 21. From FIG. 3 it may be seen that these bleed lines serve to bleed those cells that straddle the cells in which the ports 29 are momentarily located. In FIG. 5B these cells are labelled A and C. With these locations, taking into consideration the offset of the inlet 23, blow back is inhibited from occurring directly through the slot-like inlet 23 from the pressure of the air stream passing through the ports. The seals 35 affixed to the ends of the vanes assist in this prevention of blow back.

It should be noted that the seals 35 are deflected backwardly from the direction of rotation of the vanes to which they are mounted. Once this occurs it becomes easier for air and airbourne material to pass via the deflected or bent seals from a cell to the cell that trails it rather than one in advance of it due to the bent shape of the seals. For this reason, two cells are always located between the ports 29 and inlet 23 in the direction opposite that indicated by arrow 36 while only one is always located below the ports and inlet in the other direction. Thus reduction in blow back is achieved by the serial presence of more seals on the weaker side and by the provision of a desirable minimum number of five equally spaced rotor vanes.

Figure 4A:
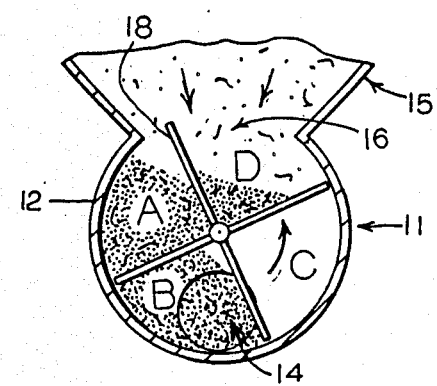
FIGS. 4A–4C are three schematic illustrations of a rotary feeder of the prior art showing a sequence of operative events.
Figure 5A:
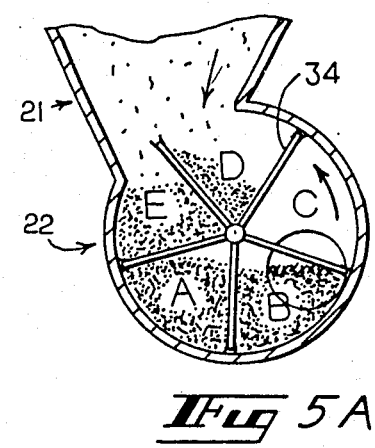
FIGS. 5A–5C are three schematic illustrations of a rotary air lock feeder of the present invention showing a sequence of events.
Figure 4B:
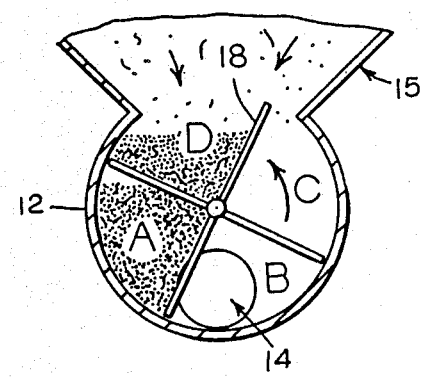
Figure 5B:
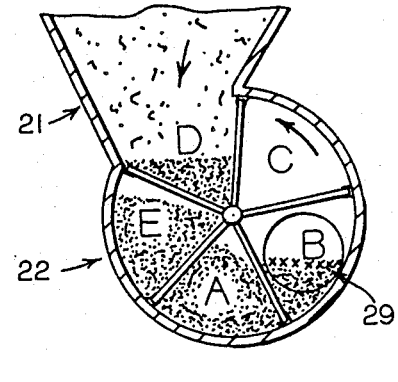
Figure 4C:
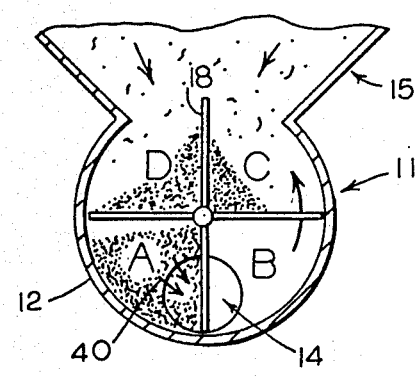
Figure 5C:
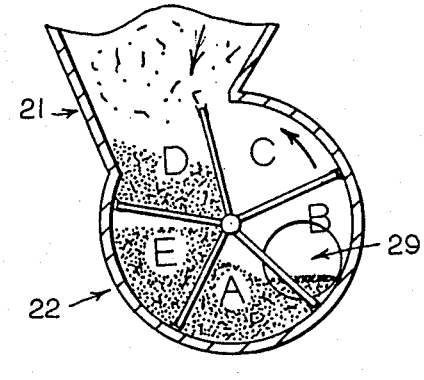

An appreciation of the improved manner in which the just described apparatus performs may be had by comparison between the sequentially illustrated feeders in FIGS. 4A-C and those sequentially shown in FIGS. 5A-C. With the prior art apparatus illustrated in FIGS. 4A-C granular material is fed into a cell A from the hopper, as shown. In cell B in FIG. 4A granular material has filled the majority of the moving cell and gravitated down to the bottom of it. In FIG. 4B it is seen that this mass of material in cell A is now just about to be presented into the path that extends between the two ports 14 located at the bottom of the chamber 11 directly beneath the axis of the chamber and the rotor shaft 17. In FIG. 4B the cells C and D are seen to be substantially void of particulated material which has already been entrained into the air stream passing between the two mutually aligned ports 14. In FIG. 4C it is seen that cell A is now momentarily occupying the left-hand half side of the path extending between the two ports. It will also be appreciated, as shown by the arrows 40, that the particulated material within cell A has been presented as a moving mass falling by gravity and being moved laterally into the air stream path. It has been this approach into the path on a massive basis that has tended to limit the prior art devices. In other words, by allowing presentation of a mass or a spacial slug of material into the airstream path, the apparatus has tended to become clogged and to function irregularly where the length of the apparatus has been greater than approximately 30 inches. Furthermore, such presentation of the material has tended to cause the entrainments to be pulsating whereby the material emitted from the feeder has tended likewise to be in the form of pulsating streams.

With reference next to FIGS. 5A–C, it is seen that particulated material within the cells is lifted upwardly into the path of travel extending between the two ports 29 which, again, are offset from the vertical plane extending through the rotor axle 33. In this manner air may flow relatively freely over the advancing surface of the material as it is rotated in batches into position between the two ports. With this process material is entrained by erosion of the material surface of the material batches as indicated by cross-hatching. Thus, the material is steadily and at relatively even rates entrained by surface erosion much like winds blowing over deserts creating sand storms. Therefore, in FIGS. 5A and 5B material in cell B is seen to be occupying the bottom portion of the path of travel between the two ports 29 leaving an air space above its surface at all times. In FIG. 5C again it may be seen that an air space exists over the surface of the material that is being presented by the rotor into the path extending between the ports. With this construction and operation a very even flow rate is generated enabling apparatus to be operative that has been made as long as some 44 inches for increased flow rate capacities without creating adverse operating conditions like those commonly associated with feeders of the prior art.

A characteristic of particulate materials is that they exhibit a natural angle of repose when accumulated into piles. By angle of repose, which sometimes is referred to as grade or slope, is meant the angle that the material surface makes with respect to the horizontal once the material is formed into a pile by gravity flow. Some materials exhibit substantial inter-particulate friction and therefore assume relative high or steep angles of repose. Conversely, other materials exhibit less inter-particulate friction and thus assume lower angles of repose. Liquids, of course, normally seek their "own level" and therefore exhibit a zero angle of repose. If particulate material is formed into a pile, at an angle higher and steeper than its angle of natural repose, its surface crumbles so that higher material gravitates downwardly until the pile is self-reshaped by gravity with its exposed surfaces at its natural angle of repose. The pile may take a lesser angle than its angle of repose, but not without it being so shaped by some ancillary means.

An important feature of Applicant's invention is the application of the just described phenomenon to rotary air lock feeders. Basically, the airstream inlets and outlets are located at a height in the metering chamber so that particulate material is lifted up between the ports with the leading or advancing surface of the material substantially at or beneath its natural angle of repose. This serves to prevent material from entering the airstream by gravity action which tends to be erratic and difficult to control reliably and smoothly.

Figure 10A:
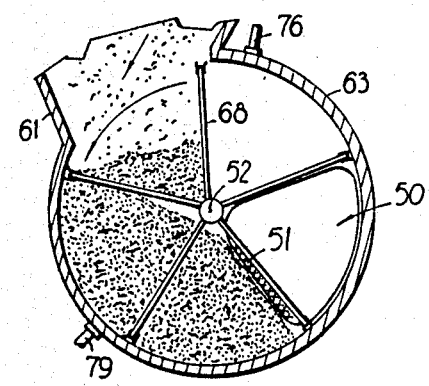
FIGS. 10A and 10B are sequential views that illustrate how material possessed of one angle of natural repose is evenly eroded into an airstream flowing between a feeder inlet and outlet positioned to provide an air flow immediately above that angle of natural repose.
Figure 10B:
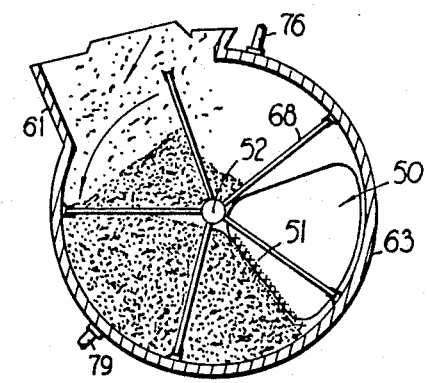

FIGS. 10A and 10B illustrate this feature. Here the inlet and outlet ports 50 are "pie" shaped and have a generally straight bottom edge 51 that extends along a radial from the chamber and rotor axis 52 which is at a 54° angle of repose R. This substantially matches the angle of natural repose of one fibrous insulation material commonly used today in insulating attic floors of buildings. Thus, as the leading edge of material enters the space between ports, as is shown to be occurring in FIG. 10A, with its leading edge just behind the vane that has just entered the space, the leading edge extends along the plane defined by edges 51 of the two ports. Since this is at the angle of repose of the material, the edge is stable, i.e. not being reshaped from gravitating material. Thus, the material is swept evenly into the space between the two ports in a regulated and controlled manner. As shown in FIG. 10B, this continues until the cell has been emptied.

Figure 11A:
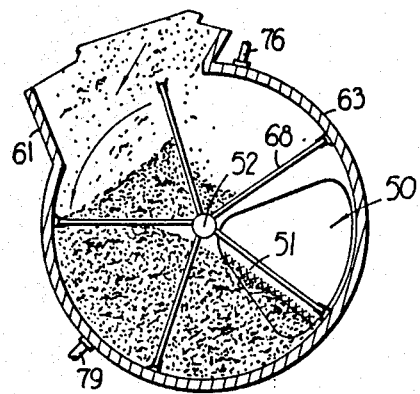
Figure 11B:
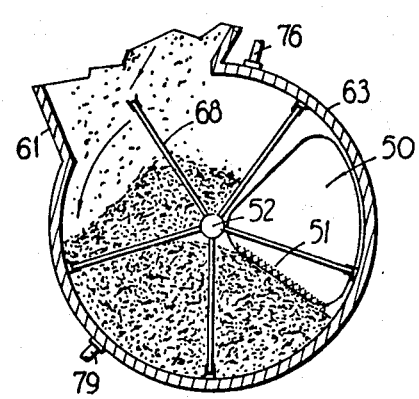
FIG. 11B illustrates a proper location of the ports for this particular type of particulate material.

In FIG. 11A a different type of material is being entrained with the ports 50 at the same location shown as in FIG. 10. This material however is characterized by having a lower angle of repose, i.e. one below 54°. As a result the leading surface of the material enters the space between the lower corners of the ports. Thus, even erosion along the entire leading surface does not occur. Rather, more of the lower portion of the leading surface is eroded. This impedes the rate of erosion due to lesser surface area being exposed to the airstream. Also, as the bottom is eroded, higher material commences to gravitate downwardly. The solution to this is illustrated in FIG. 11B where it is seen that the inlet and outlet ports 50 have been elevated, i.e. moved to a higher clock position, with the lower edge of the port oriented at the angle of repose of this other material. This demonstrates why the material should be lifted upwardly into the airstream so as to make stream entry at or below its angle of natural repose. For practical purpose entry at below its angle of repose is limited by the need to prevent fluid communication with the hopper as will now be discussed.

Figure 6:
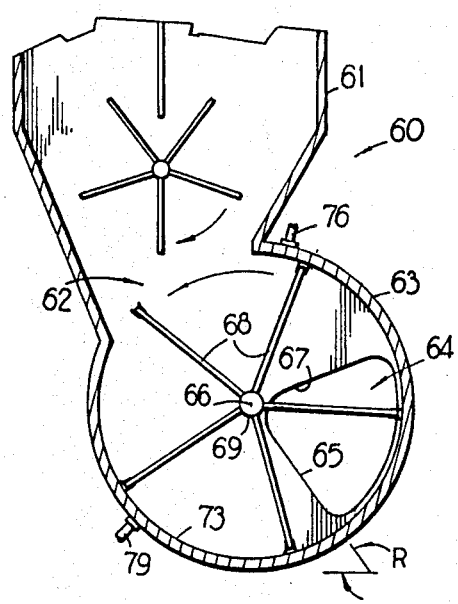
FIG. 6 is a transverse sectional view of a rotary air lock feeder embodying principles of the invention in an alternative form.

In FIG. 6 a rotary air lock feeder 60 is shown having a hopper 61 that communicates via an entry 62 into a cylindrical metering chamber 63 which has two aligned pie shaped ports 64 formed in the chamber end walls. The lower port edge 65 is located along a radial from the chamber axis 66 at an incline or grade of 54°. The upper edge 67 of the port is also located along a radial and forms a 72° angle with lower edge 65. The metering chamber is provided with a rotor having 5 vanes 68 equally spaced apart, i.e. at 72° angular intervals. If desired, the location of the ports 64 may be rendered mechanically adjustable.

Figure 7:
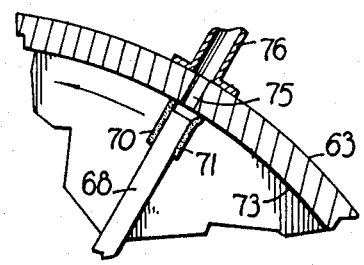
FIG. 7 is an enlarged cross-sectional view of a rotor vane end with seals passing over an air bleed line of the feeder.

The end of each vane distal an end of each vane radial the rotor shaft 69 is provided with a double seal which is shown most clearly in FIG. 7. This double seal includes a leading, resilient strip 70 secured to a leading side of the vane in contact with the cylindrical inside wall or end wall 73 of the chamber. It also includes a trailing resilient strip 71 secured to the trailing side of the vane in contact with wall 73. These sealing strips, which extend the full length of the vanes, are spaced apart a distance greater than the diameter of one or more vent holes 75 that extend through the chamber wall and which communicate with vent lines 76 that extend back to an upper portion of hopper 61. This construction ensures that adjacent moving cells provided by the rotor remain sealed as the vanes pass over the vents. Were only one strip to be provided, intercell communication would be briefly established around the seal end as it passed over the vent. Double seals also afford double resistance. Though not shown, for clarity of explanation, seals are also mounted along the sides of the vanes which sweep chamber end walls to complete pneumatic isolation of the moving cells.

Figure 8:
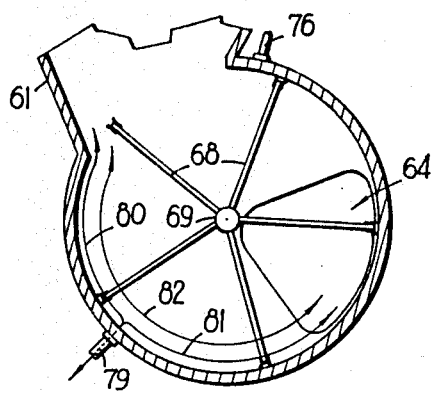
FIGS. 8 and 9 are diagrammatical views that illustrate flow paths within the feeder.
Figure 9:
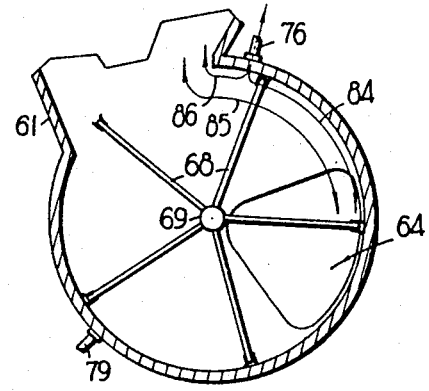

Finally, FIGS. 8 and 9 diagrammatically illustrate the importance of vent location here. Taking into account the angular spacing between adjacent rotor vanes, vent 79 is located so that communication is never established between it and the hopper, as shown by arrow 80, or between it and ports 64 as indicated by arrow 81. It follows that communication is therefore never established between the hopper and ports passing over vent 79, as indicated by arrow 82. Thus, the spacing between the vent 79 and the entry from the hopper, and between it and the ports, is slightly greater than the 72° spacing of the 5 vanes. In FIG. 9 vent 76 is located so that fluid communication is never established with it and the ports 64, as shown by arrow 84. It follows therefore that communication is never established via arrows 85 between the ports and the hopper over vent 76. Communication is only permitted between vent 76 and the hopper as shown, by arrow 86.

It thus is seen that a new rotary air lock feeder and feeding method is provided which overcomes restrictions and limitations associated with those of the prior art. It should, however, be understood that the just described embodiments merely illustrate principles of the invention in preferred forms. Many modifications, additions, and deletions may, of course, be made thereto without departure from the spirit and scope of the invention as set forth in the following claims.

What is claimed is:

1. A method of forming a stream of particulated material such as fibrous insulation comprising the steps of:
   (a) passing an airstream through a cylindrical chamber having its axis oriented generally horizontally with the airstream passing substantially along a path offset from a plane extending vertically through the chamber axis;
   (b) feeding particulated material into an upper portion of the chamber and forming it into batches; and
   (c) successively moving the batches about the chamber axis to the bottom of the chamber and then lifting the material upwardly into the airstream with substantially the entire leading upper surfaces of the batches being at and entering the airstream at a slope substantially equal to the angle of natural repose of the material with the slope of the successive batches each being substantially the same as they enter the airstream, whereby the material is entrained into the airstream by erosion of the upper surfaces of the batches while not being substantially changed by gravity.

2. The method of claim 1 wherein step (a) the material is formed into batches by rotating a multi-vaned rotor.

3. A rotary air lock feeder for feeding particulate material having an angle of repose of approximately 45° or less comprising a cylindrical chamber having two end walls joined by a cylindrical wall formed about a chamber axis; a rotor having a shaft mounted for rotation along said chamber axis from which five angularly spaced vanes extend; a pair of resilient seals mounted to an end of each of said vanes distal and radial said shaft for sealing engagement with said cylindrical wall, bleed lines extending from portions of said cylindrical wall of a size smaller than the spacing between said pairs of resilient seals, means for feeding material into an upper portion of said cylindrical chamber to one side of a vertical plane extending through said chamber axis; and an airstream port formed in a portion of each of said end walls to the other side of said vertical plane with each port having a bottom edge at or above the 4:30 or 7:30 clock radial whereby the material may be entrained in an airstream flowing between ports without substantial entrainment occurring of erratically gravitating material.

4. A rotary air lock feeder comprising a cylindrical chamber having an axis; a rotor having a shaft mounted within said cylindrical chamber for rotation along said chamber axis and at least five angularly spaced vanes that extend radially outwardly from said shaft; two resilient seals affixed to opposite sides of the ends of said vanes for sealing engagement with said chamber; a hopper communicating with said chamber through an inlet located in an upper portion of said cylindrical chamber to one side of a vertical plane extending through said chamber axis; a port formed in a lower portion of each end of said cylindrical chamber to the other side of said vertical plane through which ports a stream of air may flow, and wherein said ports are located at positions sufficiently elevated from the bottom of said chamber such that the leading side of material introduced between said ports by said rotor is along a slope substantially equal to or less than the angle of natural respose of the material, and bleed lines communicating with said cylindrical chamber between said inlet and said ports via openings into said chamber of a sized sufficiently small as to be momentarily straddled by said two resilient seals afixed to one of said vanes ends.

* * * * *